July 7, 1925.
W. W. ROBINSON
POINTER AND DIAL DEVICE
Filed Nov. 19, 1924
1,545,200
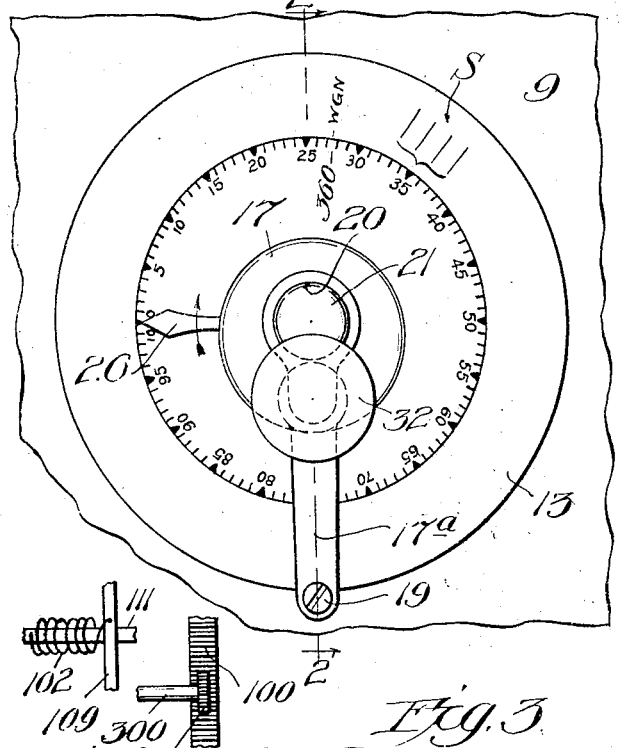
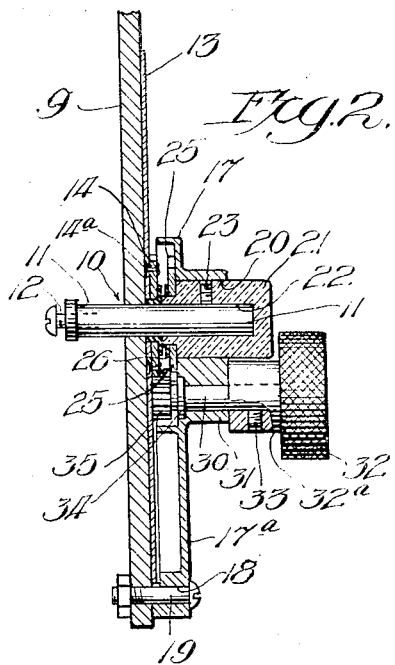
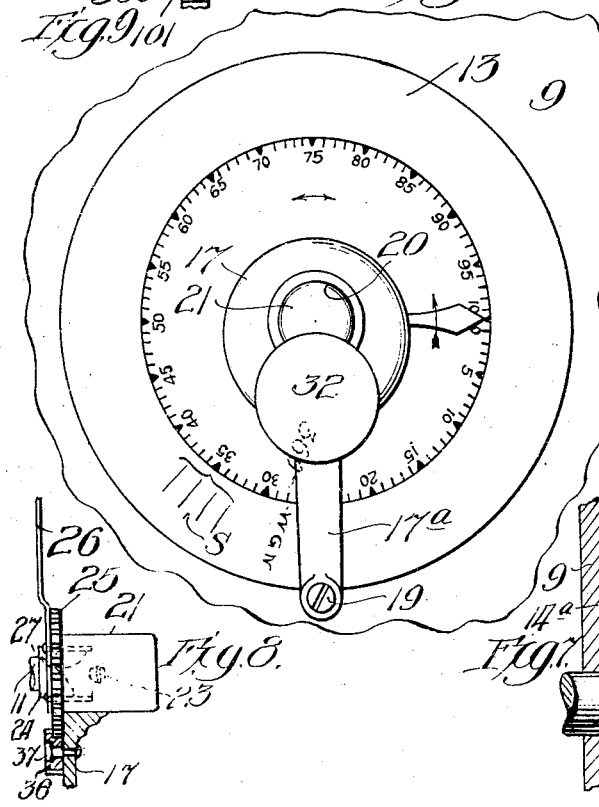
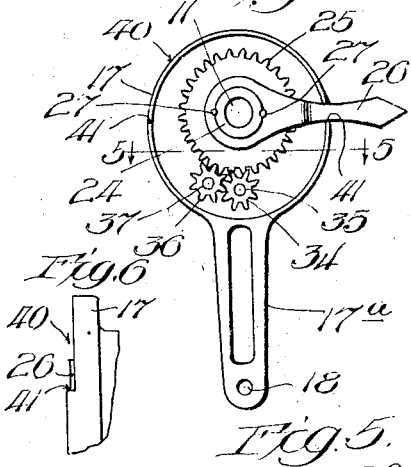
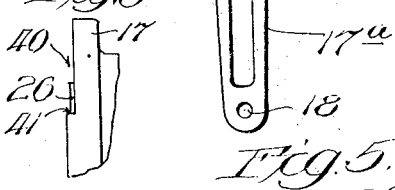
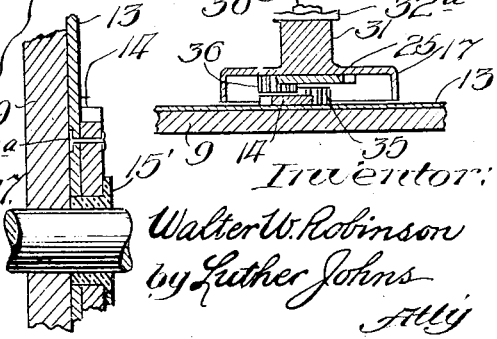
Inventor:
Walter W. Robinson
by Luther Johns
Atty Patented July 7, 1925.

1,545,200

UNITED STATES PATENT OFFICE.

WALTER W. ROBINSON, OF BELOIT, WISCONSIN.

POINTER-AND-DIAL DEVICE.

Application filed November 19, 1924. Serial No. 750,883.

*To all whom it may concern:*

Be it known that I, WALTER W. ROBINSON, a citizen of the United States, residing at Beloit, Rock County, Wisconsin, have invented certain new and useful Improvements in Pointer-and-Dial Devices, of which the following is a specification, reference being had to the accompanying drawings, forming part hereof.

The present improvements relate to devices for indicating relative pressures, movements or adjustments of a part or device, and belong to the class of instruments having a dial with graduations thereon and a pointer adapted to indicate on the dial the relative amount of the pressure, movement, or adjustment made. The present invention is well adapted for use in connection with radio equipment and may be employed at any of the various places where pointers and dials are used in that connection, but it has various other applications also.

Dials as ordinarily used in radio work, in combination locks, and in many other situations, are usually provided with marginal graduations and with a central knob for manual rotation, while a pointer in the form of a fine line is on an adjacent relatively fixed part, or the dial may be fixed and the pointer may be mounted for rotation relative thereto.

To overcome the difficulty of making fine adjustments by turning the dial or pointer directly by hand it has been suggested to provide a construction in which the rotative movement of the finger piece or knob is communicated to the dial indirectly, as by a small gear on the knob meshing with relatively large gear on the dial, whereby a relatively great amount of rotative movement of the knob results in a relatively small amount of movement of the dial. Frequently such slow-movement dials are loosely described as "verniers" or as providing vernier adjustment.

The principal objects of the present improvements are to render more easy and convenient the dial-and-pointer readings, simplify and render more easy and convenient the making of the dial-and-pointer adjustment where manually-operated; to provide with the foregoing advantages that of relatively fine adjustments with a relatively great movement of the finger piece; to provide a dial having provisions for pencil memoranda associated with the graduations whereby when a particular adjustment is had it may be logged upon the dial for immediate use thereafter; to provide a structure in which dials are readily interchangeable whereby a large amount of logged matter on different dials may readily be brought into use; to provide a pointer-and-dial device which may be readily applied to radio panel boards and the like now in use and add thereto the advantages of the present improvements; and to provide a structure simple in construction, easy to assemble, not likely to get out of order, and cheap of manufacture. Other objects and advantages will appear hereinafter.

In the drawings Figure 1 is a face view of a device embodying these improvements as applied to a panel board fragmentarily shown; Fig. 2 is a medial, vertical section through the device and panel board of Fig. 1, as on the line 2—2 thereof; Fig. 3 is a view similar to that of Fig. 1 but showing the pointer moved to the right one hundred and eighty degrees; Fig. 4 is a rear view of the frame carrying certain gears, etc; Fig. 5 is a sectional view on the line 5—5 of Fig. 4; Fig. 6 is a small fragmentary edge view of the gear housing or frame; Fig. 7 is an enlarged fragmentary detail in medial vertical section showing more clearly certain parts shown in Fig. 2; Fig. 8 is another fragmentary detail of parts shown in Fig. 2; and Fig. 9 shows an application of the improvements to such a use, for instance, as a pressure gauge.

The panel board 9 has a hole at 10 through which projects the shaft 11 having means 12 for securing it in driving relation to the particular device which is to be regulated or adjusted. From Figs. 2 and 7 it will be observed that the shaft 11 passes centrally through a disc-like dial 13 and a gear 14 secured together in ready removable relation, as by two small clips 14. A bushing 15 of insulating material, such as hard rubber, forms a central bearing for the combined gear and dial, and the bushing 15 is sufficiently loose upon the shaft 11 to permit of their rotation relative to each other.

The frame or housing 17 is in my practice a casting, and includes an upper body part and a downwardly extending stem 17ª having a hole 18 therein through which projects the bolt 19 for cooperation with the shaft 11 in holding the device nonrotatably upon the panel board. The body or housing 17 is provided with a cylindrical opening 20 on the axis of the shaft 11. A cylindrical bearing member 21 of insulating material, in my practice of hard rubber, fits within the hole 20 loosely enough for rotative movement therein. This cylindrical bearing 21 has an axial boring 22 therein to accommodate the shaft 11, and a set screw 23 holds the bearing 21 tightly upon the shaft. The bearing member 21 has a reduced portion at 24 (Fig. 8) to accommodate thereon a gear 25 and also the pointer 26, and the pointer and gear are held firmly upon the bearing member 21 by a pin or pins indicated at 27 in Figs. 4 and 8.

The gear 14 (carrying the dial 13) and the gear 25 (rigid with the shaft 11) are shown as being of the same size and as coaxially mounted on the same shaft, slightly spaced apart, and rotatable relative to each other, the gear 25 rotating with the shaft and the gear 14 being free to rotate upon the shaft.

Parallel with and below the shaft 11 is a short shaft 30 mounted for rotation in a boss or extension 31 which is integral with the frame casting. The finger wheel 32 is rigidly secured upon the shaft 30 by means of a set screw 33. A cylindrical collar 34 rigid upon the shaft 30 and accommodated in a recess in the frame holds the shaft 30 from outward movement while the stem 32ᵃ of the finger piece 32 prevents its movement inward.

On the free end of the shaft 30 is a small pinion 35 which, as will be noted from Fig. 2, meshes with the gear 14 and also (see Fig. 4) with another small pinion 36, of the same size as the pinion 35, which pinion 36 is mounted upon a headed and shouldered pin 37 (Fig. 8) extending through the wall of the casing 17 and riveted. To avoid possible confusion it is particularly pointed out that the pinion 35 in Fig. 4 is not in mesh with the gear 25 but is in mesh with the pinion 36. From Fig. 2 it will be clear that the gear 25 is on different planes from those of the pinion 35.

By turning the hand wheel or finger button 32 rotative motion is communicated from gear 35 to gear 14, and thus the dial is moved at a relatively low rate in a given direction. Through pinions 35 and 36 and the gear 25 (Fig. 4) the pointer 26 is also moved, and at the same relatively low rate. The movement of the dial and that of the pointer are, however, in opposite directions. When the finger piece is turned in the clockwise direction the pointer moves clockwise also, but the dial moves anticlockwise, and the rate is approximately one-fourth that of the rotative movement of the finger piece. It is clear that the relative rates of movement with respect to each other and with respect to the movement of the finger piece may be varied if so desired by merely varying in the construction the ratio of the pinions and gears.

The housing or frame 17 is provided with clearance at 40, Fig. 6, for the swinging movement of the pointer, and with a shoulder 41 at both sides (Figs. 4 and 6) serving as a stop to limit the movement of the pointer. The pointer therefore is free to swing in an arc of one hundred and eighty degrees from right to left, and from left to right, always passing over what is at a given time the upper portion of the dial.

In Fig. 1 the pointer is at a point marked "100," which is also zero according to the scale shown. In Fig. 3 the pointer is at the opposite side and again indicates the same point. It is clear that since both the dial and the pointer are simultaneously moving through one hundred and eighty degrees, and in reverse directions, the point on the dial at "50," Fig. 1, will be directly opposite that location when the pointer has been moved to its position shown in Fig. 3. In the change of relative positions from that shown in Fig. 1 to that shown in Fig. 3 the pointer has passed over the graduations "5"—"10"—"15" etc. up to "50" at the time the pointer has reached the top of its arc, and that half of all of the graduations on the dial (0 to 50) have been covered by the pointer when the pointer has moved through one-half of its 180° arc; and it is clear then also that when the pointer has moved through the other half of its limited path, or into its position shown in Fig. 3, it will have covered the other half of the graduations on the dial (50 to 100).

It thus results that everything on the dial can be brought in direct association with the pointer by moving the pointer and the dial through one hundred and eighty degrees in reverse directions.

The circular scale on the dial is arranged to provide a marginal and an interior space for data such as the respective wave lengths and identifying names or symbols of broadcasting stations in the radio use of the device. A single point as "35" may, on a particular one of the dials, indicate several stations, as indicated at s. After a station has thus been logged it can be tuned in conveniently and quickly by bringing the pointer to the place indicated by the log notation. If one dial should not hold all of the log notations desired or when corrections are indicated it is a simple matter to substitute another dial.

Referring to Fig. 9, the base or support 109 is the equivalent of the panel board 9 shown in other figures and the shafts 111 and 300 the equivalent of shafts 11 and 30 respectively. It is to be assumed that other operative parts such as the dial, the pointer and the pinions and gears are the same as in Figs. 1 to 8. Instead of the finger piece a pinion 100 is shown meshing with a rack 101, and a coiled spring 102 connected to the base or support 109 and to the shaft 111 is put under tension when the shaft 111 is rotatively turned. If we assume that motion from a pressure gauge element or other device be communicated to the rack 101 it is clear that the dial and pointer will be moved relative to each other in the manner already described. The spring 102 may provide the resistance to be measured or it may be simply strong enough to return the parts to initial position in some applications of the invention. The rack 101 could be used also for manual operation, but ordinarily the button 32 will be the more desirable.

To have the pointer traverse only the upper half of the dial and to be able to make all of the readings in that area is a very notable convenience and it greatly facilitates the desired adjustment. A pointer movable over a scale makes for an easier adjustment than a scale movable relative to a fixed pointer or line. Where the pointer moves in a complete circle, however, the operation becomes more difficult as the pointer descends below the horizontal middle of the dial. According to these improvements the advantage of a movable pointer are had without such disadvantages. In the device as illustrated the ratio of finger-piece movement to the combined movement of dial and pointer is about two to one, which facilitates making fine adjustments by hand.

While I have illustrated and described a highly advantageous embodiment of these improvements, I contemplate as being included in the invention such changes, departures and modifications of the illustrated structure as fall within the scope of the appended claims.

I claim:

1. The combination of a dial and a pointer operatively in association with each other, each being mounted for rotative movement, and means for moving the dial rotatively in one direction and for simultaneously moving the pointer rotatively in the opposite direction.

2. The combination of a dial and a pointer operatively in association with each other and mounted on substantially the same axis for rotative movement respectively, and means for moving the dial rotatively in one direction and for simultaneously moving the pointer rotatively in the opposite direction.

3. The combination of a circular dial and a pointer operatively in association with each other and mounted on substantially the same axis for rotative movement respectively, and means for simultaneously moving the pointer and the dial rotatively in opposite directions and at substantially the same rate.

4. The combination of a circular dial and a pointer operatively in association with each other and mounted on substantially the same axis for rotative movement, and means for moving the dial rotatively in one direction and for simultaneously moving the pointer rotatively in the opposite direction, and means for limiting the rotative movement of the dial and of the pointer to approximately one hundred and eighty degrees.

5. The combination of a circular dial and a pointer operatively in association with each other and mounted on substantially the same axis for rotative movement, and means for moving the dial rotatively in one direction at a given rate and for simultaneously moving the pointer rotatively in the opposite direction, at the same rate, and means for limiting the rotative movement of the dial and of the pointer to approximately one hundred and eighty degrees.

6. The combination of a shaft mounted for rotative movement, a dial member and a pointer member operatively in association with each other and mounted for rotative movement on said shaft, one of said members being fixed to the shaft to rotate with it, the other of said members being loosely mounted on the shaft, a finger piece rotatably mounted adjacent to said members, and gearing effectively between said finger piece and said members for moving said members rotatively in opposite directions when the finger piece is rotatively turned.

7. The combination of a shaft adapted to extend rotatively through a panel board or the like, an insulated bushing loosely on said shaft, a gear carried by said bushing, a disc-like dial carried by said gear and bushing, an insulating bearing member concentric with said shaft and secured thereto, a gear and a pointer carried by said bearing member, a pinion mounted to mesh with said first-mentioned gear, a pinion mounted to mesh with said other pinion and with said secondly-mentioned gear, and means for rotatively moving one of said pinions.

WALTER W. ROBINSON.